Feb. 3, 1953 S. RASMUSSEN 2,627,415
ELECTRICAL AUTOMATIC TIME CONTROL
Filed April 16, 1946 7 Sheets-Sheet 1

INVENTOR.
SVERRE RASMUSSEN
BY Victor J. Evans & Co.
ATTORNEYS

Feb. 3, 1953  S. RASMUSSEN  2,627,415
ELECTRICAL AUTOMATIC TIME CONTROL
Filed April 16, 1946  7 Sheets-Sheet 2

INVENTOR.
SVERRE RASMUSSEN
BY Victor J. Evans & Co.
ATTORNEYS

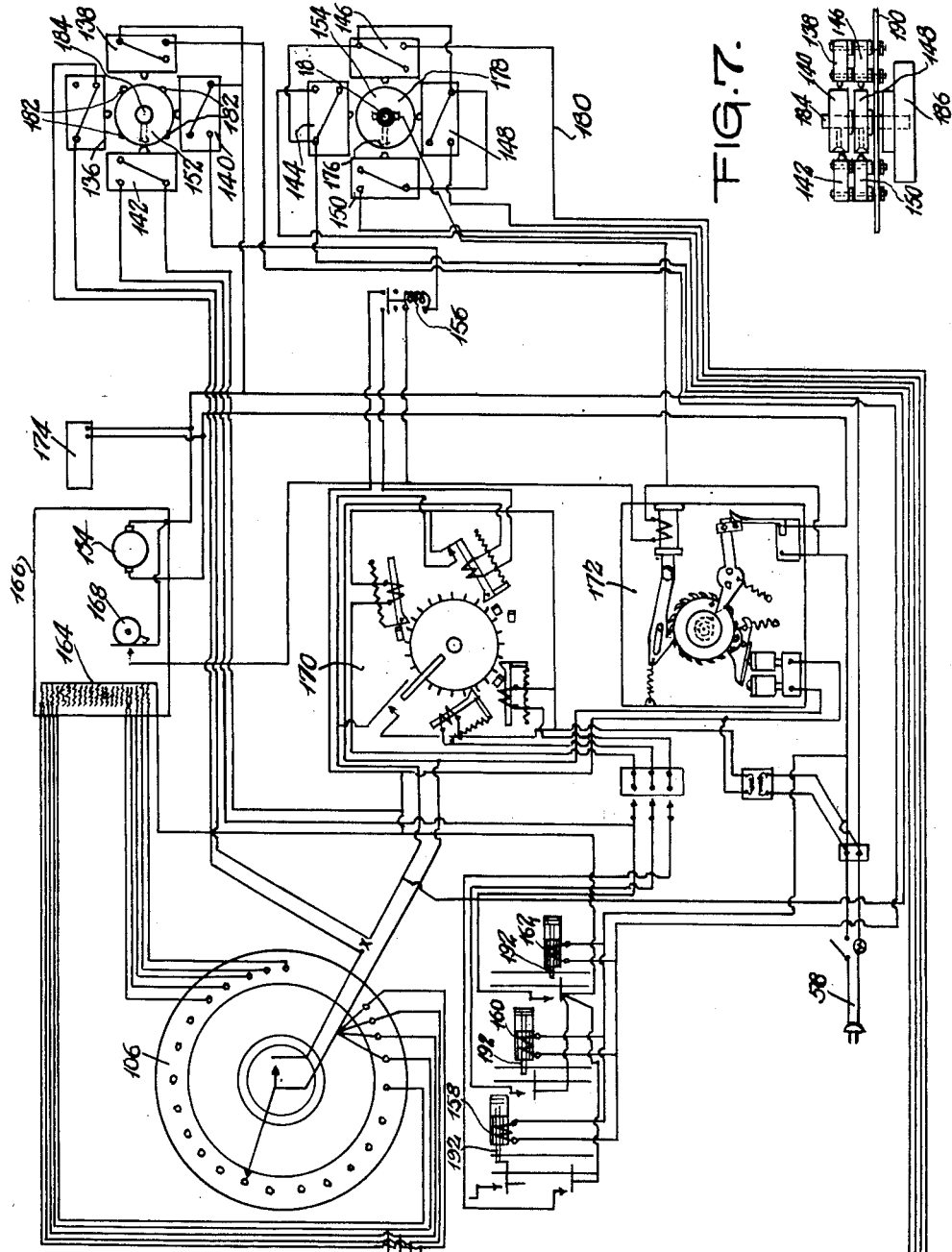

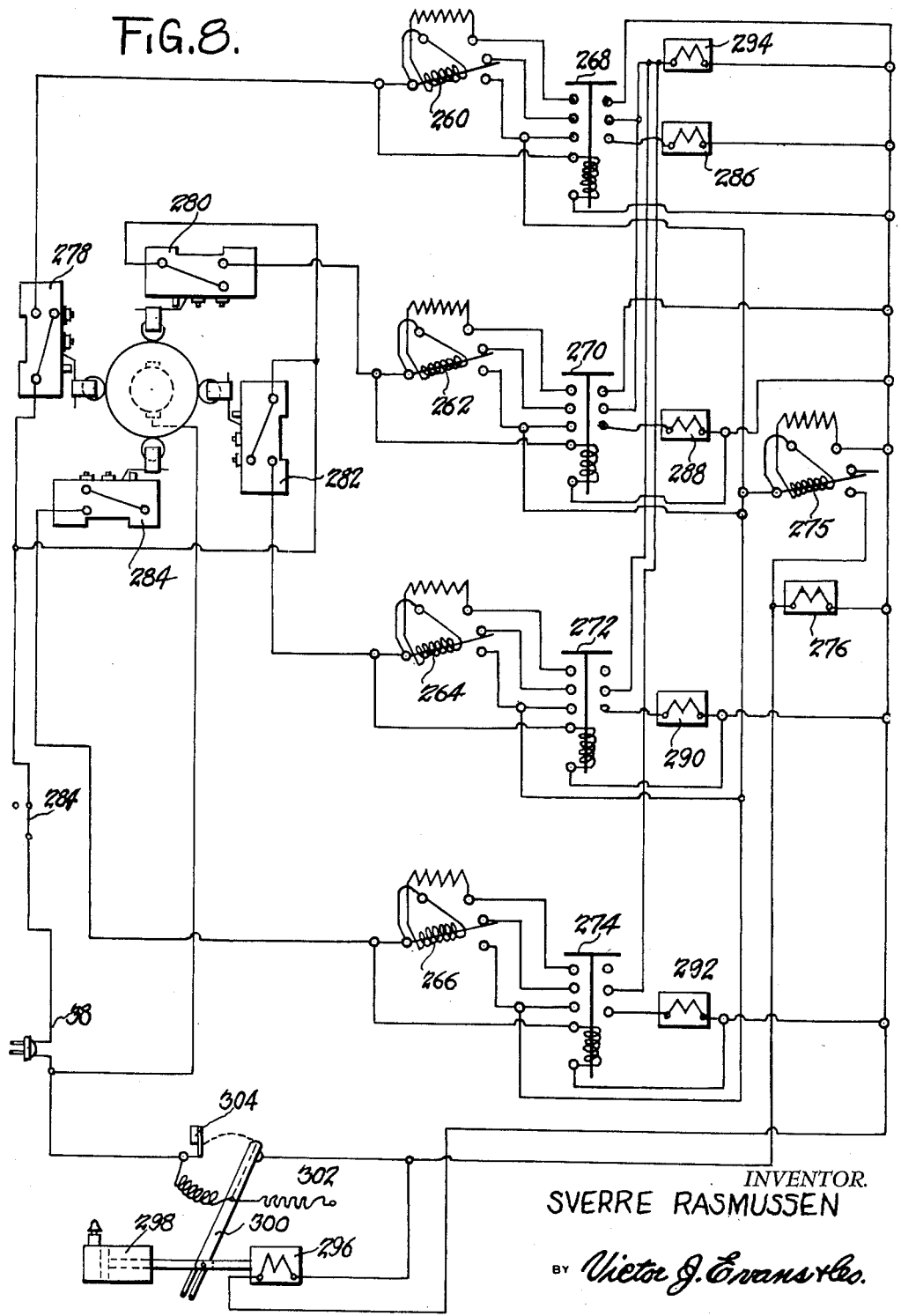

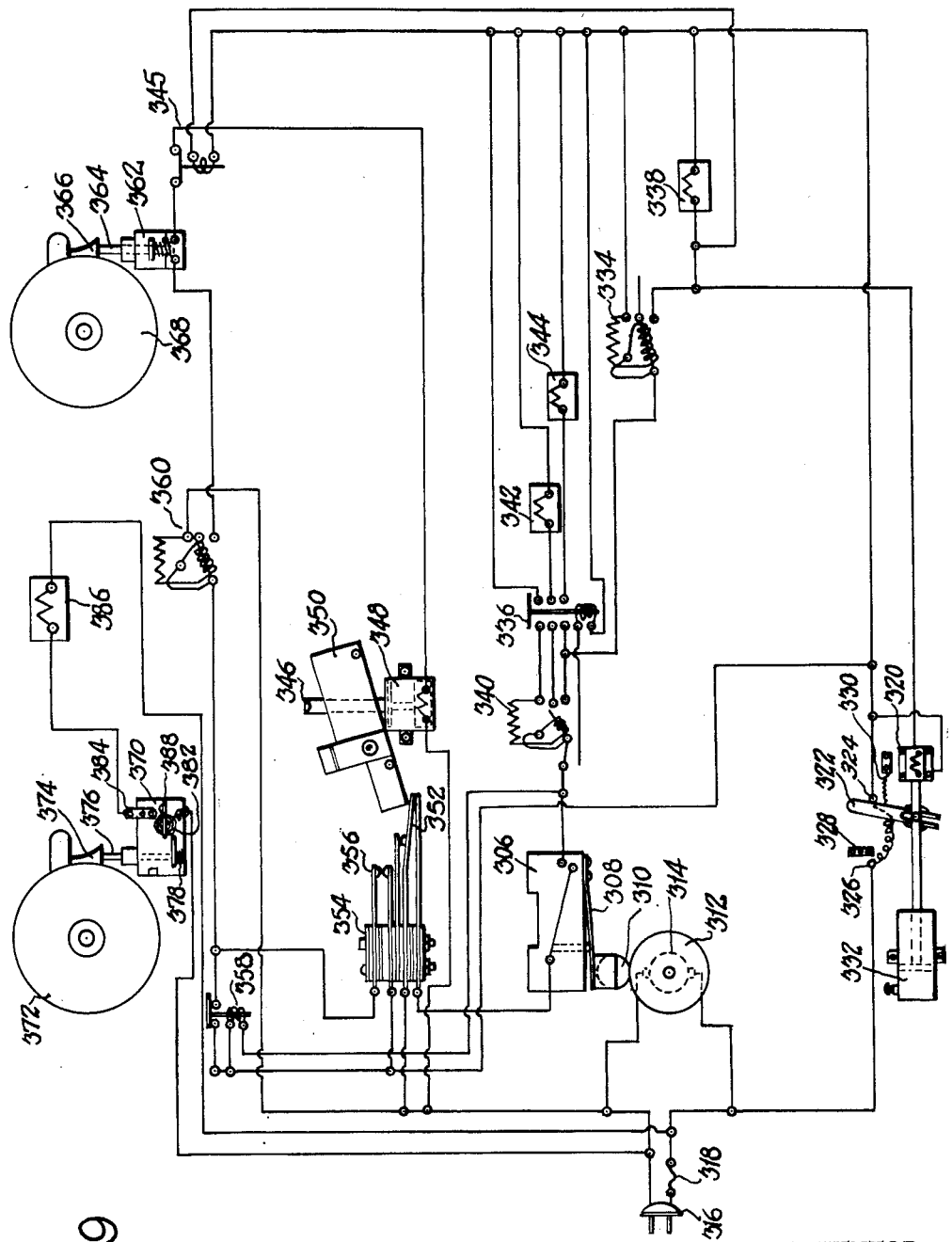

Patented Feb. 3, 1953

2,627,415

UNITED STATES PATENT OFFICE 2,627,415

ELECTRICAL AUTOMATIC TIME CONTROL

Sverre Rasmussen, New York, N. Y.

Application April 16, 1946, Serial No. 662,530

1 Claim. (Cl. 274—10)

This invention relates to an electrical automatic time control, which will operate one or several advertising records in automatic coin phonographs or juke boxes.

All coin phonographs stand idle at different time periods. This device will automatically utilize such idle time without interfering with the coin operation of the phonograph. This is accomplished by one master timer and two secondary timers activating the circuit of the coin box as well as the selector switch. In this manner new revenues may be obtained from the idle phonograph.

An object of this invention is to provide a device that is small in size, can be easily installed in a coin phonograph and can be wired to the electrical circuit of the phonograph in a few minutes.

Another object of the invention is to provide an improved automatic electrically operated timing device for playing advertising records in coin phonographs.

With the above and other objects and advantages in view the invention consists of the novel details of construction, arrangement and combination of parts more fully hereinafter described, claimed and illustrated in the accompanying drawings in which:

Figure 6 is a plan view of the circuit for the device and the parts thereof as connected thereto;

Figure 7 is a side view of one of the microswitches;

Figure 8 is a diagrammatic view of the wiring of the electrical circuit, and

Figure 9 is a diagrammatical view of a modification of the selector and control therefor which operates the advertising records.

Figure 1:
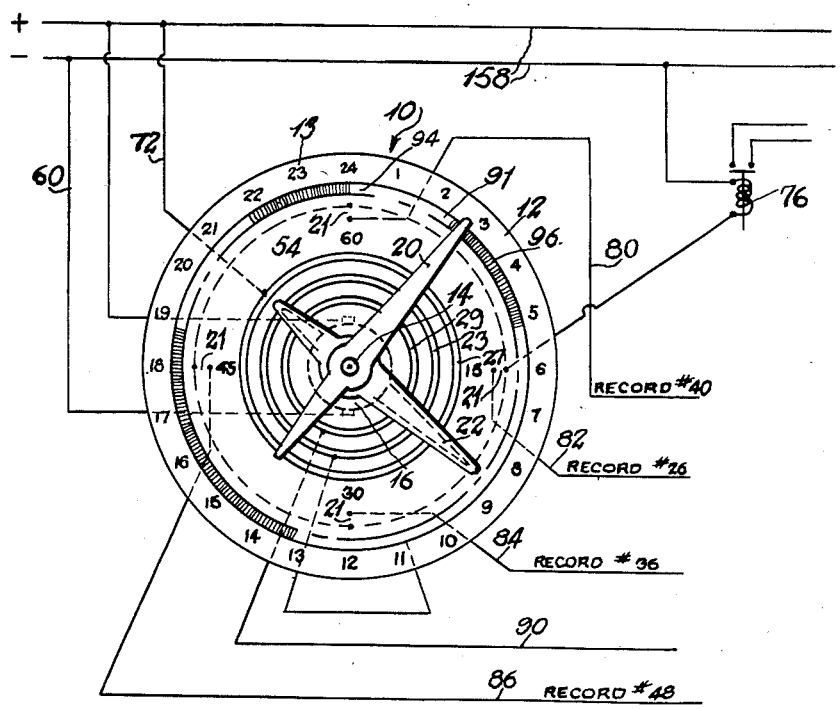
Figure 1 is a plan view of the electric clock-timer used in conjunction with an embodiment of the invention.
Figure 2:
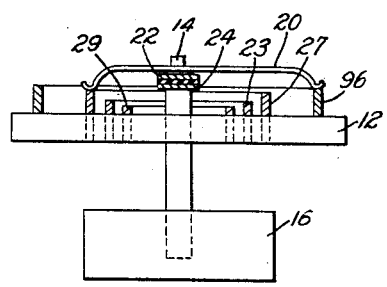
Figures 2 and 2a are elevational views thereof partly in section.
Figure 2A:
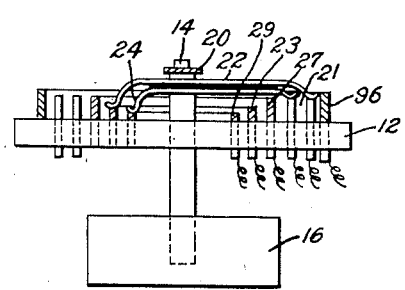

Referring more in detail to the drawings the reference numeral 10 designates the master timer which comprises an electric clock 12 having the numerals 13 thereon with three separate hands mounted on the motor shaft 14 for the motor 16, one hand 20 is geared to turn one revolution in twenty-four hours, a second hand 22 is geared to turn one revolution in one hour and a third hand 24 is attached to the under side of the second hand and separated from it by insulating material 25 and also turning one revolution in one hour.

The twenty-four hour hand 20 controls the master timer 10 for a twenty-four hour period, making contact during desirable hours of the day and night and sending current into the second hand which in turn contacts the fifteen minute points 21, leading electric current through a manual selector switch into automatic selector switch in phonograph, which together with the coin switch actuates the release for the advertising records.

Each of the three hands extend in both directions from the center shaft 14 and the hands are of various lengths. All these hands are insulated from each other and from the center shaft 14 of the clock. The shorter end of arm 20 runs on the continuous circular metal contact segment 23, the shorter end of arm 22 runs on the metal contact 27 and the shorter end of arm 24 runs on metal contact 29.

The long end of each hand will close the circuit at specified moments and with insulating material between each hand so that the circuits are separate and distinct. The short ends of the hands running on the metal contact as previously described make constant contact therewith but contact of the larger end is broken by the insulated material 96.

Contacts 21 at the time numeral 60 control the playing of record 40, contacts 21 at the time numeral 15, control the playing of record 26, contacts 21 at the time numeral 30 control the playing of record 36 and contacts 21 at the time numeral 45 control the playing of record 48.

Figure 3:
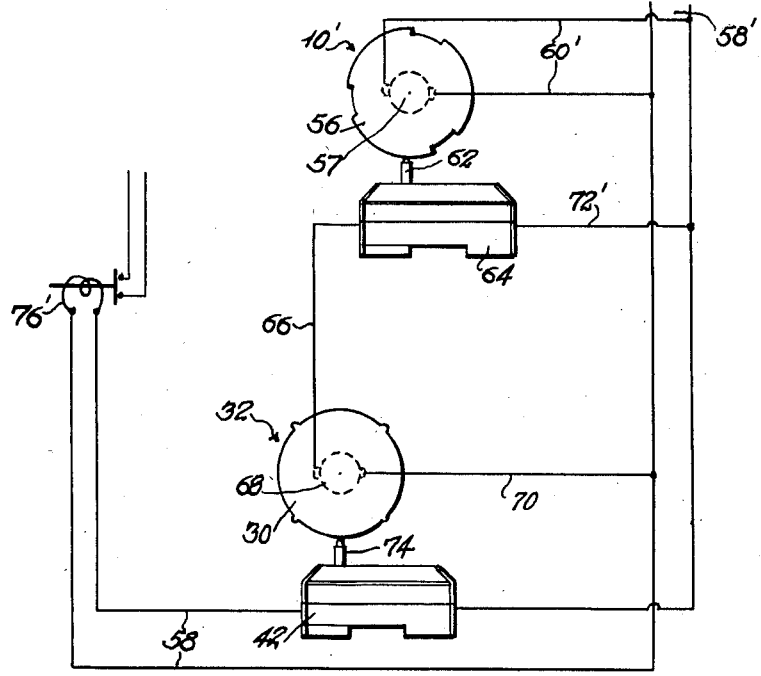
Figure 3 is a diagrammatical view of the microswitches and timer.
Figure 3:
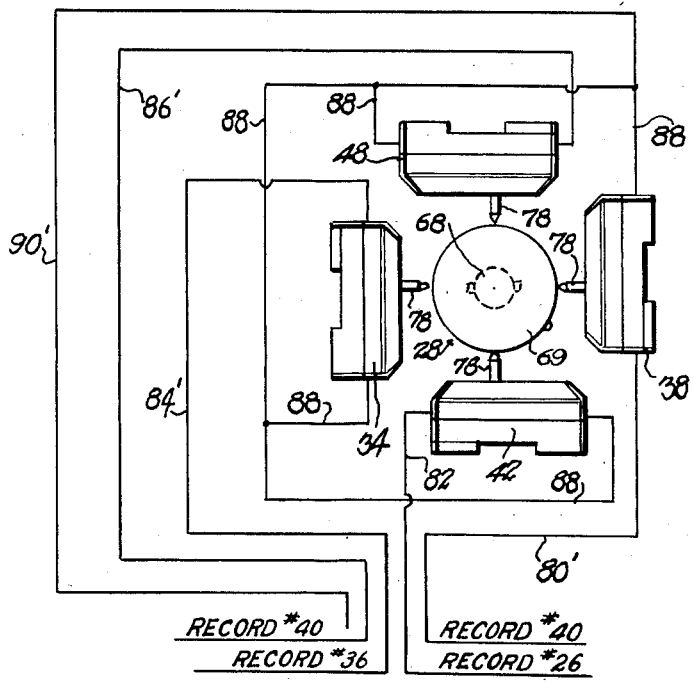

In the modification of the invention shown in Fig. 3 the cam 56 for timer 10' is actuated by motor 57 connected to the source of current 58' by leads 60' and cam 56 engages the contact arm 62 for microswitch 64 which is connected by lead 66 with motor 68 for the cam 30 for timer 32. The motor 68 is connected by leads 70 and 72' with the current source 58' with the lead 72' passing through switch 64. Cam 30 engages the contact arm 74 for microswitch 42 of the timer 32 and the current passes through switch 42 to be connected to the relay switch 76', leading to the cam switch.

Cam 69 for timer 28 is actuated by the motor 68 and has engagement with contact arms 78 for microswitches 48, 38, 42 and 34, lead 80' from switch 38 controls the playing of record 40 lead 82' from switch 42 controls the playing of record 26, lead 84' from switch 34 controls the playing of record 36 and lead 86' from switch 48 controls the playing of record 48 and the switches are connected by leads 88 to the return current lead 90' from the selector switch 92.

Timer 10 makes one turn every twenty-four hours and timers 28 and 32 each make one revolution in one hour. Timer 10 has several contact segments by which the electrical current is turned on at desirable hours during the day and night. In like manner the current is turned off when the contact arm 20 leaves the metal segments 94 and travels on the insulating material 96 between the metal segments.

The motors which drive timers 28 and 32 are wired in parallel with the contact segments 94 of timer 10. Thus timers 28 and 32 can only operate when the arm 20 is travelling on the contact segments. For this reason timers 28 and 32 will discontinue running when contact arm 20 of timer 10 leaves the metal segments 94 and travels on the insulated material 96. This breaks the circuit between the timer 10 and timers 28 and 32.

In this foregoing assembly only two motors are used since the second motor will have two cams one for the coin switch relay contact and one cam for the selector switch contact leading to the record release.

Figure 5:
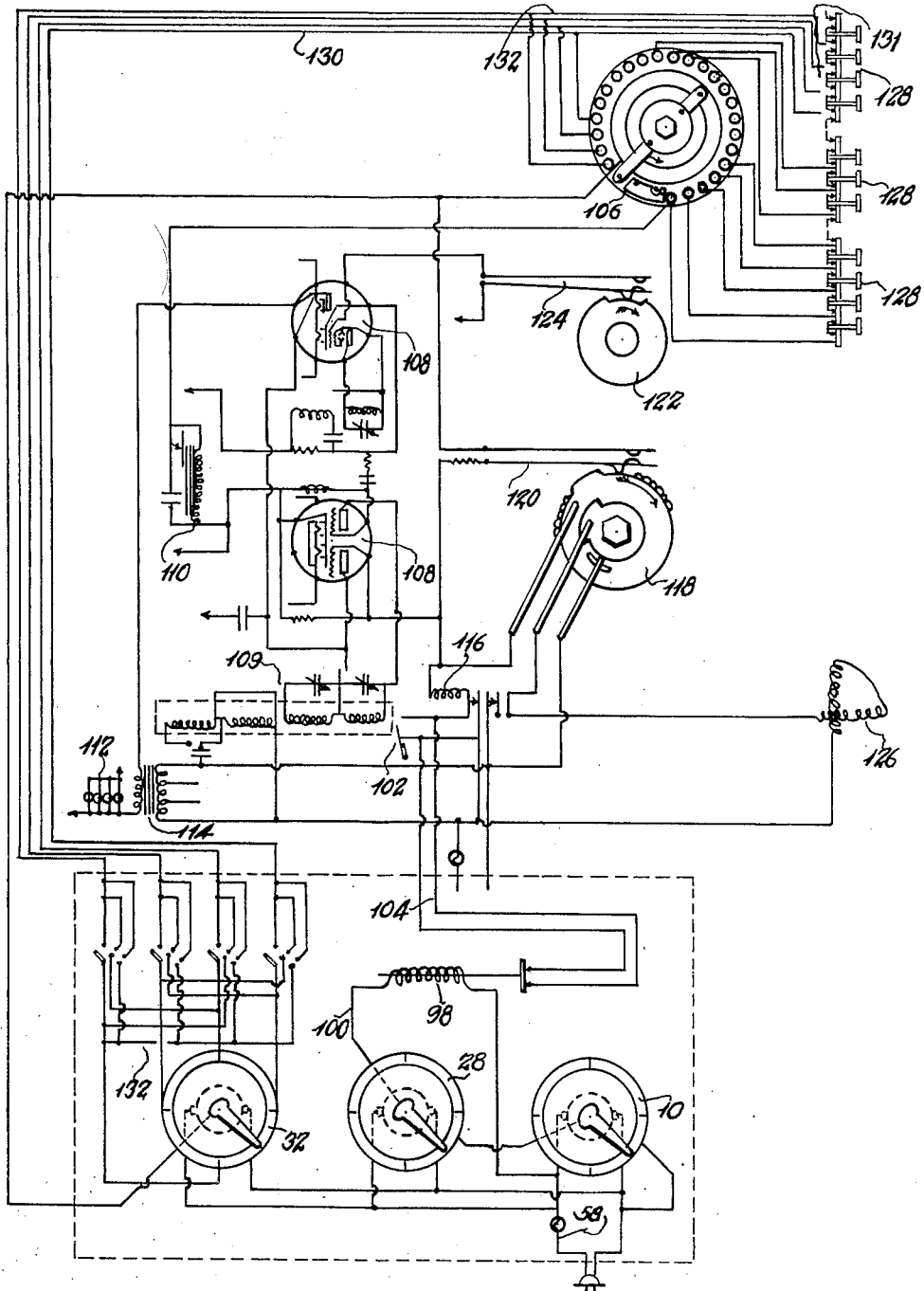
Figure 5 is a diagrammatical view of the record selector unit.

Referring to the modification disclosed by Figure 5 timers 28 and 32 each have four contact points, one for every fifteen minutes of the hour.

Timer 28 operates an electrical relay switch 98 by means of lead 100 and switch 98 is connected to the butterfly or coin switch 102 of the automatic phonograph by leads 104. Through switch 98, timer 28 will make contact for the current to flow through the circuit of the coin phonograph. This action alone will not activate the relay switch 98 which turns on the advertising records. To accomplish this a second contact is required to energize the selector switch which in turn energizes the record relay switch. This operation is taken care of by timer 32 which is co-ordinated to the timer 28 so that the contact arm of both timers will strike the same contact point at the same time every fifteen minutes.

Timer 32 is wired to the automatic selector switch 106 in the circuit of the phonograph which includes the amplifying tubes 108 and their actuating circuits 109 with the tuning plate 110, the dial lamps 112 and reducing transformer 114, the phonograph coin relay switch 116, the impulse cam 118 and impulse switch 120, R. F. cam 122 and R. F. switch 124, and the motor winding 126 which are all part of the coin phonograph and do not necessarily form part of the invention except for the combination thereof with the timer control.

The selector switch 106 is energized by numbered buttons 128 operated manually by the customer. In the case of a phonograph already installed and in operation the paid advertising will take the place of the left hand buttons 128. In a new phonograph four special places will be provided for these advertising records. In installing the advertising records in a phonograph already operating, the four leads 130 leading to the automatic selector switch from the push buttons will be cut at 131 and will be led to the timer 32 and the contact points on the selector will be connected thereto at 132.

Thus the timer 32 has replaced the operation by means of the buttons on the manual selector board and the timer 32 is performing the same operation as the customer, when he presses the selector button releasing the selection.

Wired in parallel with the wires 130 from timer 32 are the manual selector switches 132' by which the four advertising records can be shifted around to play at different time and in different order. These switches will permit different combinations in which to play the advertising records.

The timer will not interfere with the playing of the selections operated by coins since it operates only when the juke box is idle. When a coin is dropped in the coin slot of the automatic phonograph the new advertising device is automatically cut off from the circuit of the phonograph and cannot interfere with the selection while playing. Likewise if the advertising record is playing while a coin is dropped it will not interfere with the advertising record but will be stopped until the record is finished, when it will drop down upon the butterfly switch and start the selection.

The advertising records can be controlled to play any length of time desired to give less interference with the paid selections.

It may be desirable however to play the advertising records in automatic phonographs every fifteen minutes without regards to the paid-for selections.

This would guarantee to the advertiser a specified amount of advertising as long as the juke box is being played.

In order to accomplish this it will be necessary to interrupt the coin operated selection every fifteen minutes.

This requires the set up shown in the modification disclosed by Figure 6 in the circuit of the timer.

This timer will run continually as long as the juke box circuit is on and when this is turned off for the night, the timer is also turned off. Since the electrical current of the automatic phonograph is used for this new timer.

The new circuit is actuated by only one motor 134 eight microswitches 136 to 150 inclusive, two contact cams 152 and 154 for the switches, one relay 156 and three solenoids 158, 160 and 162. Switch 136 is normally closed while the other switches are normally open.

At 164 are shown the record relays in the phonograph 166 the record at 168 the selection counter at 170 the pay counter 172 and the amplifier or speaker at 174 and the various circuits for controlling these elements which are not a part of the invention except in so far as the combination is concerned.

Switch 146 will be closed every fifteen minutes by the contact point 176 on cam 178, and will by lead 180 actuate one of the records, switches 148, 150 and 144 will also in turn actuate the remaining records. Thus each of the switches are actuated every fifteen minutes by the contact 176 on cam 178. Cam 152 has four contacts points 182 which will actuate all four micro switches 136 to 142 every fifteen minutes.

Switch 138 actuates the three solenoids 158 to 162 to close the coin slot in the coin slot box. This is to insure that no coin will drop down upon the coin switch at the same time this timer for advertising records goes on. It is an added precaution working in cooperation with microswitch 140 which operates relay 156 which when actuated cuts off the current to the cancellation solenoid. This relay is normally closed, allowing the flow of current to actuate the cancel circuit after each record. However when the fifteen minutes contact is made with the microswitch 140 of the timer the relay opens the cancellation circuit and no cancellation is made while the advertising record plays. If this is not done, the following would happen. If one out of five paid-for records is playing first before the fifteen minutes period, and the timer makes contact while it is still playing, nothing will happen until the record is finished. When the paid for record is finished the cancellation circuit is actuated and one cancellation is made. Now the advertising timer will stop all further plays and the advertising record will play. When it is finished it will close the cancellation circuit and two cancellations have been made, and therefore the next coin will be lost. To avoid this the cancel circuit is opened by the timer and the advertising record is played while the cancellation is held in abeyance. The advertising record will then make the proper cancellation when it is finished and the paid for cycle can go on.

Switch 142 actuates the coin or butterfly switch.

Switch 136 normally closed opens one side of the selector circuit between the common wire from the record microswitches and the contact point on the selector proper.

The cams 152 and 154 are mounted on the axle 184 of the motor 186 and the gear 188 for actuating the axle one revolution per hour, 190 is the box on which the timer is mounted and the solenoids are arranged to push the rods 192 in the path of the cams in the coin slots.

Figure 4:
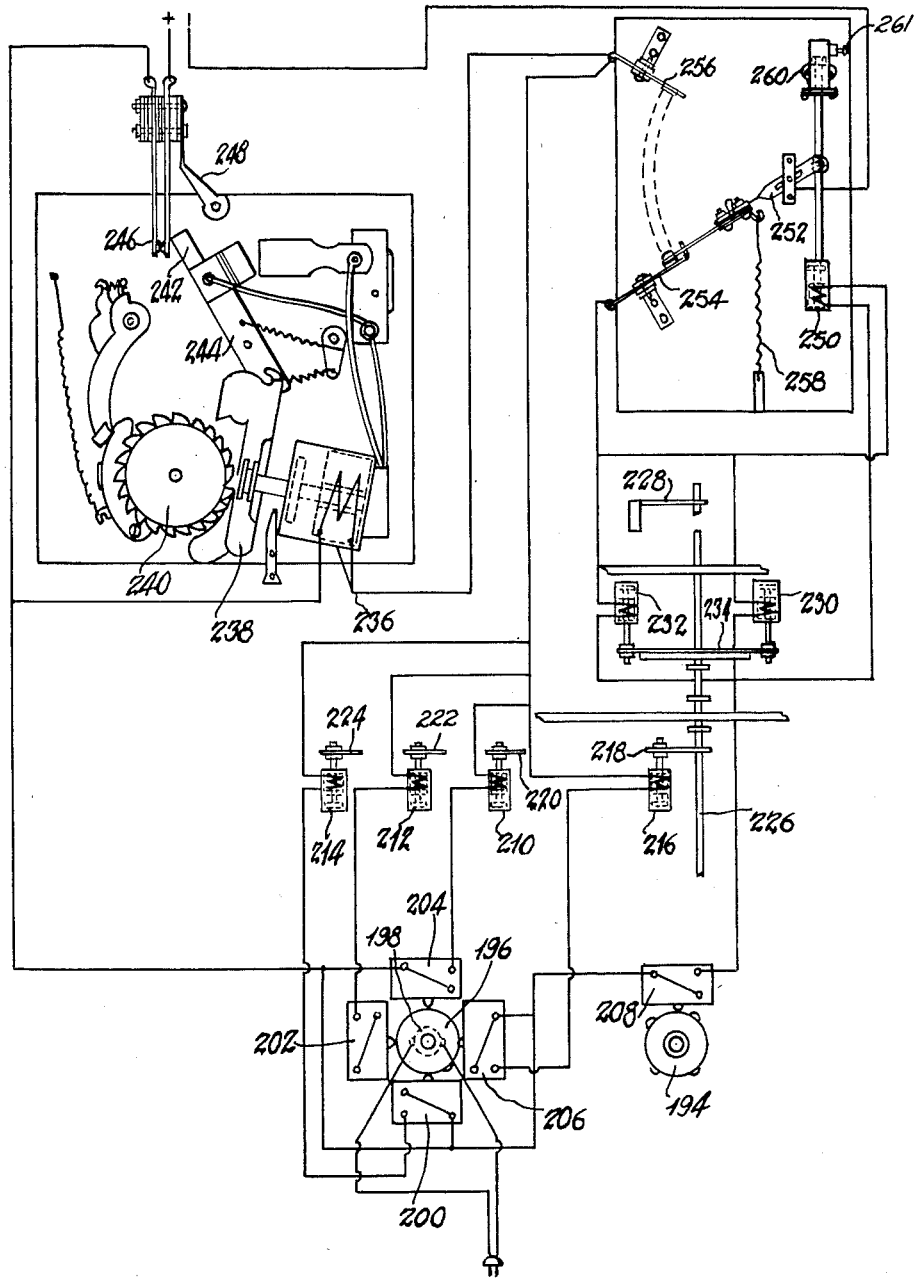
Figure 4 is a diagrammatical view of the selector and control therefore which operates the advertising records.

In the set up shown in Figure 4 timing cams 194 and 196 are provided, which are actuated by a motor 198 in this instance only five microswitches 200 to 208 respectively are employed to operate the selector solenoids 210, 212, 214 and 216 which in turn operates the selector rods 218 to 224 respectively for the advertising records which are placed in the regular magazine of all juke boxes that have been placed in operation but when the unit is adapted for new juke boxes that have not been placed in operation a special magazine rack will be added to the present magazine. Selector rod 226 is moved into the path of selector arm 228 which in turn actuates the mechanism for selecting the desired record. Solenoids 230 and 232 when actuated operate the cancellation wheel 234 which in turn operates selector rod 226 out of the path of the selector arm 228.

Solenoid 236 actuates the counter arm 238 releasing ratchet wheel 240 one notch. A dielectric member 242 is fastened to the electrical contact arm 244 and member 242 makes contact for the advertising circuit at the switch 246. When paid for record is finished and the switch is supported by bracket 248.

Solenoid 250 moves contact arm 252 from contact 254 to contact 256 after which the arm 252 is brought back again to original position with contact 254 with the aid of spring 258. The return of this arm 252 is delayed for about three minutes which is accomplished by the air valve 260 which can be regulated by the valve control screw 261 for slower and faster motion.

Every fifteen minutes cam 196 will contact one of the selector switches. If a paid for record is playing at the fifteen minute period switch 246 is open. When paid for record is finished contact arm 244 drops to engage and close the switch 246 by means of member 242.

The circuit is however still open as long as selector microswitch and the cancellation switch are open. The selector microswitch and cancellation switches close in that order and the circuit is completed when the solenoids 230, 232 and 250 are actuated. This cancels any selector rods which may have been pushed in. At the same time it moves arm 252 from contact 254 to contact 256, thereby closing the selector circuit which actuates one of the four selector solenoids. Simultaneously solenoid 236 is actuated lifting arm 238 closing switch 244 which starts the motor and the entire mechanical operation of the record cycle.

This cycle places the advertising record on the turn table for playing, which plays only for about 30 seconds. When the cancellation action of the reproducing arm cancels the operation and the record is brought back to its magazine rack, switch 244 is again opened.

The advertising circuit will remain closed for a period of approximately three minutes. This is to allow for timer required in case a paid for record goes on just before the fifteen minutes advertising record would immediately go on a second time. To avoid this a repetition which would continue as long as the contact continued, the air valve 260 is so adjusted that it will hold the contact arm 252 back for about three minutes. Thus the circuit is kept open as soon as the advertising record is started and kept open until the microswitches and cancellation switch are opened discontinuing the circuit.

In the modification disclosed by Figure 8 four bimetal delayed actions relays 260, 262, 264 and 266 are employed together with four single throw, three pole relays 268, 270, 272 and 274, one bimetal delayed action relay 275 for coin switch 276 and complete cancellation.

In this instance which is operated similar to that previously described for Figure 4, microswitches 278, 280, 282 and 284 are used, and the primary switch 284 which is open when paid for record plays. Solenoid selectors 286, 288, 290 and 292 are used as record selectors and solenoid 294 as the cancellation solenoid, as in Figure 4 solenoid 296 is used for complete cancellation, in conjunction with the air valve 298 contact arm 300, spring 302 for returning the arm 300 and 304 the limit.

Since the operation as shown in Figure 8 is the same as shown in Figure 4 the operation thereof will not be repeated.

In the modification disclosed by Figure 9 the set up shown permits the playing of advertising records in between the musical selections selected by patrons when these are run successively.

In order to allow advertising records to go on in between two paid for records when several coins have been deposited, it is necessary to employ a panel of twelve electrical switches. Eight of these switches are in series, that is, one will open all. These eight switches are operated by the projection on each record holder in the record magazine. In order to accomplish this a microswitch 306 is employed having the actuating arm 308 thereon provided with a roller 310 which engages the cam 312 operated by the electric motor 314, which is connected by the plug 316 to a source of current and a fuse 318 interposed in the line protects the device from damage from electrical disturbances.

One side of the motor is connected to the solenoid 320 for the complete opening of the advertising circuit. The solenoid actuates the arm 322 from contact 324 to 326, the stop 328 limits the movement of the arm and the spring 330 connected to the arm 322 returns the arm to engagement with contact 324 upon completion of the advertising record. The air pot or dash pot 332 controls the return of the arm 322 and the operation of these various parts above outlined are the same as previously described in the operation of Figure 4. The solenoid 320 is connected to a delayed bimetal relay 334 which in turn is connected at one end to the single throw three pole relay 336, and at the other end to the coin solenoid 338. The relay 336 is connected at one end to a delayed action bi-metal relay 340 which is connected to the microswitch 306 and the relay 336 is also connected to the cancellation solenoid 342 and selector solenoid 344. The solenoid 338 relay 334 and solenoids 342 and 344 are all tapped to the line from the contact 324 to a relay 345 which is normally closed and opens when coin solenoid 338 is actuated by a coin deposited in the machine thus allowing the coin contact arm 346 to be controlled by solenoid 348 to allow advertising records to play in between two paid for selections when multicoins have been deposited. A dielectric member 350 is fastened to the arm 346 and this member actuates the contact points 352 for the advertising circuit switch 354 having the contact points 356 for closing preliminary circuit for opening contact between two paid for selections.

The operation of these elements have been previously described to some extent and it is believed that a further description of this operation is not required.

The switch 354 is connected to a relay 358 which is normally open but is closed when the microswitch 306 is closed and this relay is connected to a delayed action bi-metal relay 360 which will avoid unnecessary pulling out of the coin contact arm 346.

The relay 360 is connected to the switch 362 having the contact arm 364 which is operated by the projection 366 on the record magazine center 368 upon which the selected records swing and the switch 362 is also connected to the relay 345.

The other side of the motor 314 is connected to the selector switch 370 which will prevent the next advertising record mounted on the record magazine center 372 upon which record holder swings from playing when the projection 374 thereon engages the contact 376 of the switch 370. The contact 376 is urged into engagement with the contact 380 by a spring 378 which by means of a spring 382 will be in contact with the contact point 384 connected to the selector solenoid 386 for the number one paid for record.

Therefore until the projection 374 engages contact 376, contact 380 is out of engagement with contact 384 but upon depression of the contact 376 by projection 374 contact 380 will be released to engage contact 384 to prevent the advertising record from playing at the next fifteen minute interval should a paid for record be playing or selected for playing.

Therefore when one of the eight paid for records is playing the circuit is open. When the record returns the projection thereon engages a switch contact and the circuit is again closed.

The eight switches covering the eight paid for records, actuate a solenoid 348 which pulls down the coin contact arm 346 and this operation is necessary since the arm remains closed when several coins have been deposited in succession. The coin contact arm 346 must be in an open or down position to allow the advertising circuit to close. When the juke box is idle this contact is normally open and the advertising circuit at this point is closed.

The eight switches operate in conjunction with the normally open relay 358, the normally closed relays 345 contact points 352 operated by the arms 346 and the bimetal relays.

The four remaining switches for the advertising records are in parallel, each one operating separately and these switches operate a solenoid 386 which pulls selector pin number one into selector position after the advertising record has finished and returned. This is to avoid the next advertising record in the magazine to play in case no selections are made during the playing of the advertising record.

There has thus been provided a device which is provided with an electrical contact element which actuated by a coin contact arm is closed when the arm is disengaged and open when a paid record is playing. A manual switch for a circuit maker and breaker for the electrical timing motor on which a cam having a one contact point is attached for the operation of one cam bimetal delayed action relay is used or a point for each relay added thereto for the successful operation of the device. Microswitches which are actuated by the cam depending upon the number of bimetal delayed action relays are used. Manual switches for discontinuing the advertising records at will and panels having four bimetal delayed action relay switches with single pole and double throw action for the operation of the records. In the various hookups four single throw three pole relay switches are employed together with a cancellation solenoid actuated every fifteen minutes by the microswitch timer through the normally closed contact element on the bimetal delayed action relay switches and through single throw three poles relay pawls. Where four selector solenoids are actuated through record contact segment of the bimetal delayed action relay switches and single throw thru poles relay switches are employed one for each advertising record.

There is also shown a secondary bimetal delayed action relay switch operated from the second contact segment of a bimetal delayed action relay panel actuating after a short relay a solenoid which closes the coin contact arm starting the automatic phonograph or a solenoid operating an arm which breaks the entire advertising circuit after advertising cycle is completed. A delayed action dash pot or air valve is shown connected to a solenoid which operates the dash pot and thus holds the circuit open for a specified time period and the arm being returned slowly to contact by a spiral spring.

The use of eight switches in a twelve record magazine or twenty switches in a twenty-four record magazine four for advertising purposes and the remainder paid selections. These switches all being connected in series, and the four records for advertising are actuated by four separate switches normally open when records are at rest and connected in parallel are operated by the record holder. A delayed action relay switch in connection with the eight or twenty switches in circuit with a single throw single pole relay switch normally closed on the record magazine switch panel. A solenoid in circuit with these switches on the panel which will actuate the coin switch contact arm at the fifteen minute interval only when the musical selections are running continuously, as when a series of coins have been deposited and the contact element operated by the coin switch contact arm, closed when a record is playing and open when the phonograph is at rest. This contact segment closing the circuit for the eight switches on record magazine switch panel.

The above distinctive features of the invention and the advantages and operation of the device, it is believed will be apparent to those skilled in the art and it is to be understood that changes in the details of construction, arrangement and combination of parts may be resorted to providing they fall within the spirit of the invention and the scope of the appended claim.

Having thus described the invention what is claimed as new and desired to be secured by Letters Patent is:

A device of the character described in combination with a coin operated phonograph having a magazine of records to be played and including a predetermined number of advertising records, a panel having a plurality of selecter contacts, a plurality of manually operated buttons for individually energizing all except a said predetermined number of contacts to determine a particular record to be played, a motor operated timing means having a plurality of individually spaced contacts each connected to one of said predetermined number of contacts, and a movable contact engageable with each of said spaced contacts in timed relation, to energize the said predetermined number of selector contacts to cause the playing of the advertising records at predetermined time intervals in sequence, a motor for operating the phonograph, a coin switch to receive coins and operated by a coin to energize said motor to permit the selection of a record to be played, and an electrical relay switch operated by said timing means simultaneously with the engagement of the movable contact with the spaced contacts on said timer to render said coin switch operative to energize said motor to operate said phonograph at the said previously determined time intervals to play the predetermined number of records in sequence between the operations of said coin switch due to the receiving of coins to play selective records.

SVERRE RASMUSSEN.

REFERENCES CITED

The following references are of record in the file of this patent:

UNITED STATES PATENTS

| Number | Name | Date |
|---|---|---|
| 1,371,935 | Rubin | Mar. 15, 1921 |
| 2,034,224 | Butler | Mar. 17, 1936 |
| 2,102,531 | Hoke, Jr. | Dec. 14, 1937 |
| 2,190,026 | Jacobson | Feb. 13, 1940 |
| 2,232,925 | Mills | Feb. 25, 1941 |
| 2,240,609 | Cummings | May 6, 1941 |